Dec. 21, 1926.
C. M. ALLEN
1,611,502
METHOD OF MEASURING THE RATE OF FLOW OF LIQUID
Original Filed Oct. 2, 1922
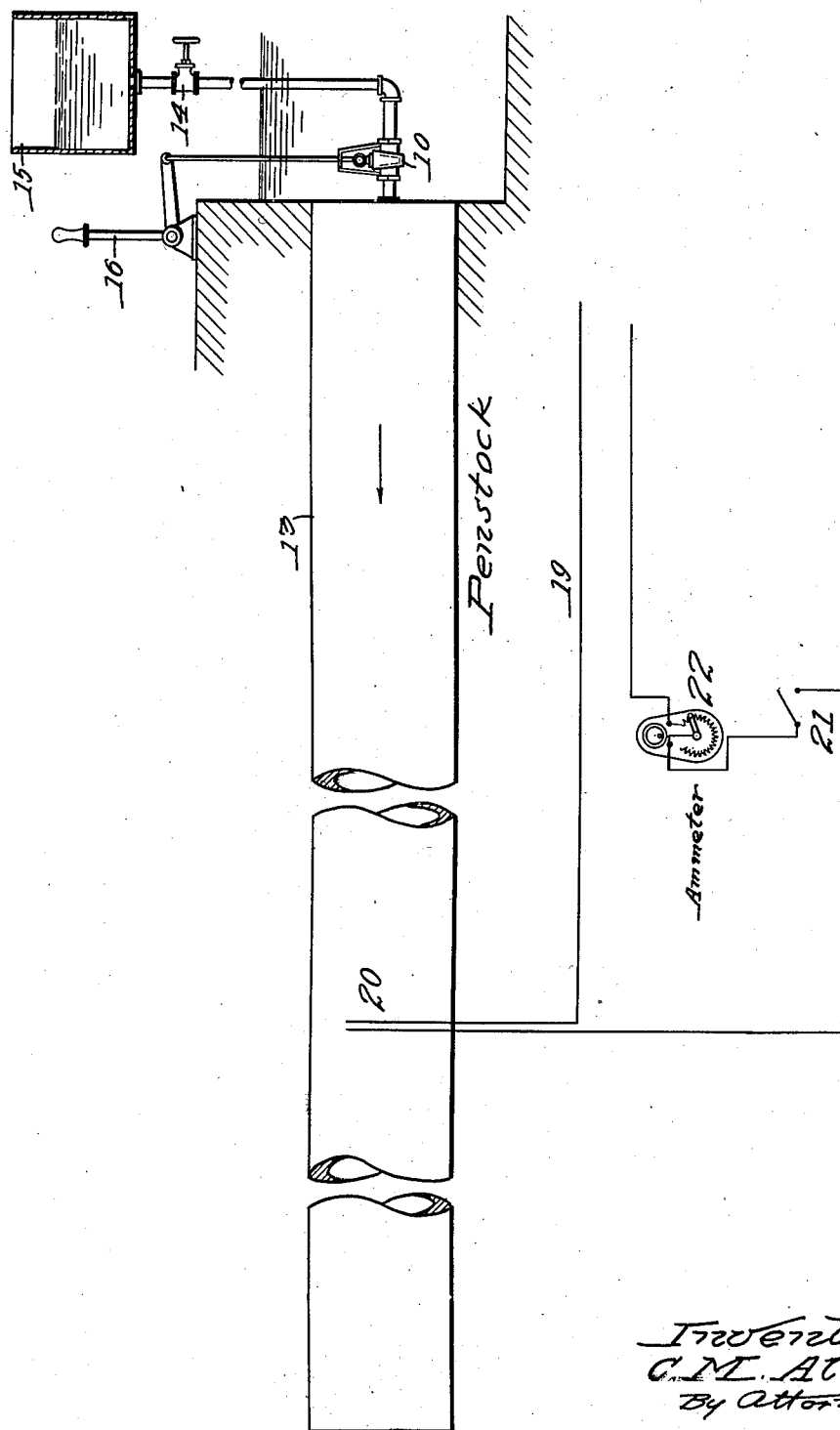

Patented Dec. 21, 1926.

1,611,502

UNITED STATES PATENT OFFICE.

CHARLES M. ALLEN, OF WORCESTER, MASSACHUSETTS.

METHOD OF MEASURING THE RATE OF FLOW OF LIQUID.

Original application filed October 2, 1922, Serial No. 591,997, and in Canada July 7, 1925. Divided and this application filed June 3, 1926. Serial No. 113,562.

This is a division of my copending application Serial No. 591,997, filed Oct. 2, 1922.

This invention relates to a method of measuring the time which a liquid takes in passing from one point to another through a pipe, penstock, or the like of constant or varying cross sections so that the rate of flow can be determined.

The principal object of the invention is to provide a method of measurement which can be used universally even where the water cannot be seen and which will be accurate, reliable, and simple.

Reference is to be had to the accompanying drawing which is a diagrammatic view of a penstock showing how this method can be carried out in connection therewith.

This method depends upon the fact that the electrical conductivity of a liquid is changed by certain chemicals which may be held in solution therein. It consists briefly in introducing into the pipe or other conductor a salt or other soluble compound which will affect the electrical conductivity of the liquid and observing the time of introduction of the compound, and, at the point below, the time of initial appearance, maximum density and final disappearance thereof. One way to do this is to measure the current that passes between two electrodes introduced into the pipe, or to measure the voltage or resistance.

In the form shown, the flow of water is being measured in a large steel penstock 13 or conduit of constant or variable section. At the upper end of the penstock, which can be taken as a starting point in some cases, a quick acting valve 10 is located in it. This is shown as placed at the center of the penstock 13 at its end and in the plane of the entrance. The solution is piped to this valve from a tank 15 elevated to give any desired head or a pressure tank can be used. In the tank is placed a solution of a soluble salt or compound which will affect the conductivity of the water as for example common salt. The quick acting valve can be operated by a handle 16 and preferably is arranged so that it may be held open for any desired length of time.

At a distance downstream from the valve 10 is placed a pair of electrodes 20. The volume of water in the conduit between the point of introduction and the electrodes is known. One of these electrodes is connected with one side of the line 19. The other is connected through a switch 21 with an electrical measuring instrument 22, as for example an ammeter which is connected to the other side of the line. This ammeter should be of a type in which the oscillations are well damped and may conveniently be controlled. The ammeter usually shows an initial reading depending upon the acidity of the water and the size and distance apart of the electrodes.

Telephonic or other instantaneous communication is established between two observers, one at the point at which the salt solution is introduced, that is, at the valve 10, and the other at the ammeter. Stop watches can be employed to determine the time of the first appearance of a change in the electrical conductivity of the water, time of maximum density and time of disappearance. The center of gravity of the change can be determined from these factors. This is an example of one way to carry out the method. The voltage or resistance can be measured instead of the current or the observations can be made in any scientific way, for example by recording instruments.

In operation, the soluble compound, as for example, salt, in solution in the tank, is introduced into the penstock or conduit 13 by opening the valve 10. At the instant this valve is opened and closed, signals by telephone or otherwise are given to the observer at the ammeter and the stop watches are started. He observes the ammeter and notes the time of initial appearance of increased conductivity that results in a larger current, also the time of maximum density of conductivity and, if desired, disappearance of the increased current.

I find in practice that the time of initial appearance of increased current and the time of maximum current are definite and reliable but that the time of disappearance of the change is indeterminate and therefore the mean time which involves that is unreliable. Comparison of tests made in this way with those conducted with a weir, weighing tank, or standard measuring device, shows that the elapsed time between introduction and maximum density of solution can be accurately determined. The time elapsed as stated above appears to give the correct time independent of the length or variation in diameter and internal condition of the pipe but more accurate results are obtained by observing the time of passage of the center of gravity of the charge. Having determined the elapsed time by this method the rate of flow is found by the well known formula— rate cu. ft. per sec.=volume in cu. ft. divided by time in seconds. Reasonable variations in the strength of charge of the solution, the length of charge, the amount of deflection of the instrument, size and clearance of the electrodes do not affect materially the accuracy of the results. I have also compared the results of this method with the so-called "color" method in which a soluble color is used to measure the rate of flow and which is limited to cases in which the water can be seen and I find that the accuracy of the present method is greater than that of the "color method".

Although I have illustrated and described only a single apparatus and referred to only a single soluble compound for use in connection with this method, I am aware of the fact that the invention is capable of being carried out independent of the particular apparatus illustrated, and that it can be performed accurately with any soluble compound that affects the electrical conductivity of the liquid in accordance with the claims.

Having described my invention, what I claim is:—

1. The method of measuring the rate of flow of water in a conduit, which method consists in introducing into the water flowing freely in the conduit a soluble substance which locally alters the electrical conductivity of the water; measuring the resulting changes produced by the solution in an electric current passing between two electrodes immersed in the water and constituting parts of an energized circuit, the location of which pair of electrodes with reference to the point of introduction being such as to include between the two points a known volume of water, and measuring the elapsed time between the time of introduction and the time of any change in the electric current between the pair of electrodes.

2. In an apparatus for measuring the rate of flow of water in a conduit, the combination with the conduit for the water, of a supply tank for a soluble substance that will alter the electrical conductivity of the water, a pipe leading from the supply tank to said conduit for conducting said soluble substance into the conduit and constituting the point of introduction, a valve in said pipe, means whereby the valve can be actuated quickly to introduce small quantities of the soluble substance into the conduit, a pair of electrodes in the conduit at a distance below the point of introduction such that the volume of water between the point of introduction and the electrodes can be determined, and an electric circuit including said electrodes and an electrical measuring instrument.

In testimony whereof I have hereunto affixed my signature.

CHARLES M. ALLEN.